(12) United States Patent
Liao et al.

(10) Patent No.: US 9,571,306 B2
(45) Date of Patent: Feb. 14, 2017

(54) DEVICE AND METHOD FOR ELIMINATING CHANNEL EFFECT

(71) Applicant: MStar Semiconductor, Inc., Hsinchu Hsien (TW)

(72) Inventors: Yi-Ying Liao, Hsinchu (TW); Tai-Lai Tung, Hsinchu (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/819,523

(22) Filed: Aug. 6, 2015

(65) Prior Publication Data

US 2016/0373276 A1    Dec. 22, 2016

(30) Foreign Application Priority Data

Jun. 17, 2015  (TW) .............................. 104119537 A (51) Int. Cl.
| | |
|---|---|
| *H03H 7/30* | (2006.01) |
| *H03H 7/40* | (2006.01) |
| *H03K 5/159* | (2006.01) |
| *H04L 25/02* | (2006.01) |
| *H04L 25/03* | (2006.01) |

(52) U.S. Cl.
CPC ......... *H04L 25/022* (2013.01); *H04L 25/0204* (2013.01); *H04L 25/0222* (2013.01); *H04L 25/0224* (2013.01); *H04L 25/03057* (2013.01)

(58) Field of Classification Search
CPC .......... H03G 3/345; H03G 3/344; H03G 3/34; H04B 1/1027; H04L 1/20
USPC .................. 375/229–236, 259–285, 316–352
See application file for complete search history.

(56) References Cited

U.S. PATENT DOCUMENTS

| | | | | | |
|---|---|---|---|---|---|
| 5,519,730 | A | * | 5/1996 | Jasper ................... | H04L 5/0048 370/207 |
| 6,141,393 | A | * | 10/2000 | Thomas ............... | H04B 7/0851 375/347 |
| 6,154,443 | A | * | 11/2000 | Huang ................. | H04B 1/7093 370/210 |
| 6,320,903 | B1 | * | 11/2001 | Isaksson ........... | H04L 25/03159 375/232 |

(Continued)

OTHER PUBLICATIONS

Taiwan Intellectual Property Office, "Office Action", issued on Oct. 17, 2016.

*Primary Examiner* — James M Perez
(74) *Attorney, Agent, or Firm* — WPAT, PC; Justin King; Jonathan Chiang (57) ABSTRACT

A device for eliminating a channel effect is provided. A time-domain channel estimating unit generates a channel estimation result according to a first reference signal. A fast Fourier transform (FFT) unit performs FFT on the channel estimation result to generate a plurality of channel frequency responses corresponding to a plurality of frequency indices. An adjusting unit receives a plurality of input signals, and determines whether to adjust the input signal of each of the frequency indices according to the amplitude of the channel frequency response of each of the frequency indices to generate a set of adjusted signals. An inverse fast Fourier transform (IFFT) unit performs IFFT on a set of output signals associated with the set of adjusted signals to generate a feedback signal. The time-domain channel estimating unit further generates another channel estimation result according to a second reference signal and the feedback signal.

10 Claims, 5 Drawing Sheets

(56) References Cited

U.S. PATENT DOCUMENTS

| | | | |
|---|---|---|---|
| 6,327,314 B1* | 12/2001 | Cimini, Jr. | G01S 3/72 342/378 |
| 6,654,429 B1* | 11/2003 | Li | H04L 1/06 370/252 |
| 6,665,349 B1* | 12/2003 | Cherubini | H04L 5/143 375/219 |
| 6,862,326 B1* | 3/2005 | Eran | H04L 25/03993 375/229 |
| 6,928,120 B1* | 8/2005 | Zhang | H04L 27/2679 370/464 |
| 7,254,171 B2* | 8/2007 | Hudson | H04B 1/7102 333/18 |
| 7,324,437 B1* | 1/2008 | Czylwik | H04L 1/06 370/203 |
| 7,330,505 B2* | 2/2008 | Fitton | H04L 1/0061 375/229 |
| 7,388,541 B1* | 6/2008 | Yang | G01C 21/206 342/464 |
| 7,580,467 B2* | 8/2009 | Sampath | H04L 25/0232 375/260 |
| 7,773,682 B2* | 8/2010 | Hayashi | H04L 25/03159 375/260 |
| 7,778,357 B2* | 8/2010 | Alcouffe | H04L 25/0202 375/260 |
| 7,912,118 B2* | 3/2011 | Wang | H04L 25/03006 375/229 |
| 8,582,676 B1* | 11/2013 | Zhang | H04L 27/2657 375/260 |
| 8,681,912 B2* | 3/2014 | Park | H04L 25/0228 375/232 |
| 8,711,919 B2* | 4/2014 | Kumar | H04L 25/0307 375/229 |
| 8,731,037 B2* | 5/2014 | Murakami | H04L 27/2691 370/203 |
| 8,848,774 B2* | 9/2014 | Zhong | H04L 25/03038 375/232 |
| 8,942,336 B2* | 1/2015 | Ghosh | H04L 27/0006 375/137 |
| 9,369,309 B2* | 6/2016 | Seyama | H04L 25/0202 |
| 9,401,826 B2* | 7/2016 | Eitel | H04L 25/0238 |
| 9,473,332 B2* | 10/2016 | Bajcsy | H04B 1/40 |
| 2002/0037058 A1* | 3/2002 | Birru | H04L 25/03159 375/340 |
| 2002/0086707 A1* | 7/2002 | Struhsaker | H01Q 1/246 455/561 |
| 2002/0094044 A1* | 7/2002 | Kolze | H04B 1/1027 375/346 |
| 2002/0168002 A1* | 11/2002 | Birru | H03H 21/0012 375/233 |
| 2002/0181549 A1* | 12/2002 | Linnartz | H04L 25/03038 375/142 |
| 2003/0086371 A1* | 5/2003 | Walton | H04L 1/0002 370/235 |
| 2004/0125235 A1* | 7/2004 | Kim | H04N 5/211 348/607 |
| 2004/0127223 A1* | 7/2004 | Li | H04B 7/022 455/446 |
| 2004/0131007 A1* | 7/2004 | Smee | H04B 7/0669 370/208 |
| 2004/0202260 A1* | 10/2004 | Tung | H04L 25/03261 375/350 |
| 2005/0195914 A1* | 9/2005 | Kim | H04L 27/2647 375/267 |
| 2005/0259767 A1* | 11/2005 | Garmany | H04B 7/005 375/343 |
| 2006/0104339 A1* | 5/2006 | Langberg | H04B 17/0085 375/222 |
| 2006/0227859 A1* | 10/2006 | Wei | H04L 25/03057 375/233 |
| 2006/0269016 A1* | 11/2006 | Long | H04L 5/0048 375/340 |
| 2006/0280257 A1* | 12/2006 | Kim | H04B 7/0619 375/267 |
| 2007/0036239 A1* | 2/2007 | Ma | H04L 25/0228 375/316 |
| 2007/0121718 A1* | 5/2007 | Wang | H04L 25/03057 375/233 |
| 2007/0223565 A1* | 9/2007 | Gaal | H04B 1/71055 375/141 |
| 2007/0248195 A1* | 10/2007 | Lerner | H04L 7/042 375/343 |
| 2007/0258528 A1* | 11/2007 | Kwun | H04L 27/2623 375/260 |
| 2008/0075179 A1* | 3/2008 | Li | H04L 25/03038 375/260 |
| 2008/0143580 A1* | 6/2008 | Glazko | H04B 1/1036 455/307 |
| 2008/0144749 A1* | 6/2008 | Wilhelmsson | H04L 27/2647 375/346 |
| 2008/0187034 A1* | 8/2008 | Liang | H04L 25/03057 375/232 |
| 2008/0219371 A1* | 9/2008 | Hong | H04L 25/022 375/260 |
| 2008/0240314 A1* | 10/2008 | Gaal | H04J 11/0056 375/346 |
| 2008/0260052 A1* | 10/2008 | Hayashi | H04L 1/20 375/260 |
| 2008/0310566 A1* | 12/2008 | Tsuruta | H04L 27/0014 375/350 |
| 2009/0092195 A1* | 4/2009 | Guo | H04L 27/2623 375/260 |
| 2009/0168929 A1* | 7/2009 | Liu | H03G 3/345 375/346 |
| 2009/0296845 A1 | 12/2009 | Alexander et al. | |
| 2010/0067366 A1* | 3/2010 | Nicoli | H04B 7/0417 370/210 |
| 2010/0091822 A1* | 4/2010 | Cookman | H04L 25/03159 375/148 |
| 2010/0189162 A1* | 7/2010 | Yoshimoto | H03M 13/27 375/141 |
| 2010/0284478 A1* | 11/2010 | Liao | H04L 27/2647 375/260 |
| 2011/0026620 A1* | 2/2011 | Liao | H04L 25/0224 375/260 |
| 2011/0150153 A1* | 6/2011 | Liu | H04L 25/03159 375/348 |
| 2011/0212743 A1* | 9/2011 | Yokomakura | H04L 5/0026 455/509 |
| 2012/0294350 A1* | 11/2012 | Allpress | H04L 25/022 375/229 |
| 2013/0107996 A1* | 5/2013 | Hewavithana | H04L 25/022 375/350 |
| 2013/0177064 A1* | 7/2013 | Ido | H03M 13/41 375/232 |
| 2013/0259113 A1* | 10/2013 | Kumar | H04L 25/0307 375/233 |
| 2014/0185660 A1* | 7/2014 | Wei | H04L 27/2647 375/230 |
| 2015/0146806 A1* | 5/2015 | Terry | H04L 25/0204 375/260 |
| 2015/0372745 A1* | 12/2015 | Abe | H04B 7/08 375/232 |
| 2016/0119167 A1* | 4/2016 | Abe | H04B 7/0851 375/232 |
| 2016/0173298 A1* | 6/2016 | Abe | H04L 27/2636 375/340 |

\* cited by examiner

DEVICE AND METHOD FOR ELIMINATING CHANNEL EFFECT

This application claims the benefit of Taiwan application Serial No. 104119537, filed Jun. 17, 2015, the subject matter of which is incorporated herein by reference.

BACKGROUND OF THE INVENTION

Field of the Invention

The invention relates in general to a wireless signal receiving system, and more particularly to a technology for eliminating a channel effect in a wireless signal receiving system.

Description of the Related Art

Digital television broadcasting has matured and become popular with the ever-improving communication technologies. In addition to being transmitted through cables, digital television signals may be propagated in form of wireless signals via base stations or artificial satellites. Wireless signals are inevitably affected and interfered by transmission environments during the transmission process. Thus, a receiver ends needs to evaluate corresponding channel effects to eliminate the influence the channel effects have on signal contents through equalization in order to correctly decode received data.

Figure 1A:
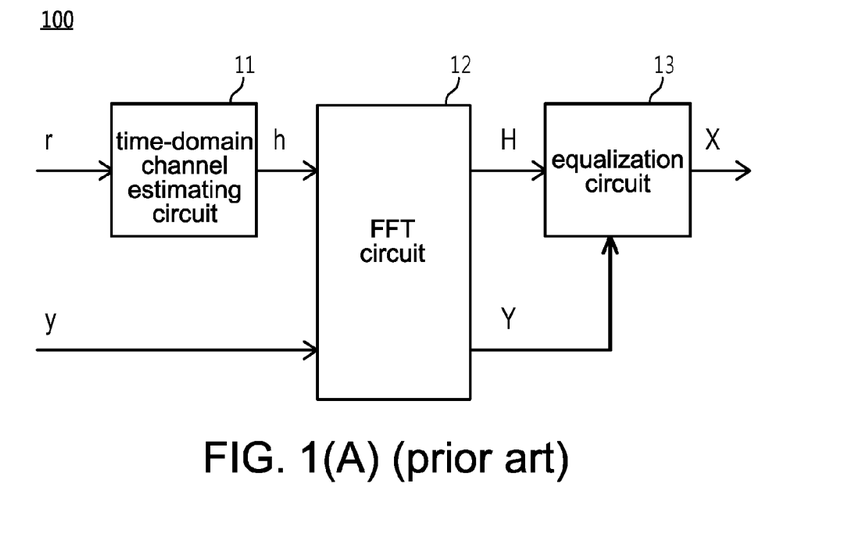
FIG. 1(A) is a functional block diagram of a stereotypic channel effect eliminating device.

Digital terrestrial multimedia broadcasting (DTMB) is a main digital television broadcasting standard currently adopted in the Mainland China. According to the DTMB specification, signals in a multi-carrier mode are formed by a series of alternating data headers and frame bodies. From a time-domain perspective, the data headers may be regarded as periodically placed between multiple frame bodies. Contents in the header frames are known, and may thus serve as reference data for channel estimation at a DTMB receiver end. FIG. 1(A) shows a functional block diagram of a stereotypic channel effect eliminating device 100. A receiver 100 includes a time-domain channel estimating circuit 11, a fast Fourier transform (FFT) circuit 12 and an equalization circuit 13. The time-domain channel estimating circuit 11 generates a channel estimation result h according to reference data r (e.g., a data header). The FFT circuit 12 converts the channel estimation result h and a data signal y (e.g., a frame body) respectively to a frequency-domain channel estimation result H and frequency-domain data Y. The equalization circuit 13 then generates an equalized signal X according to the frequency-domain channel estimation result H and the frequency-domain data Y to reconstruct the contents of the data signal y. However, in the event where the known data (the reference signal r) has an inadequate length, the channel estimation result h the time-domain channel estimating circuit 11 generates according to the reference data r cannot reflect the true channel effect, such that the channel effect eliminating device 100 may fail to correctly reconstruct the contents of the data signal y.

Figure 1B:
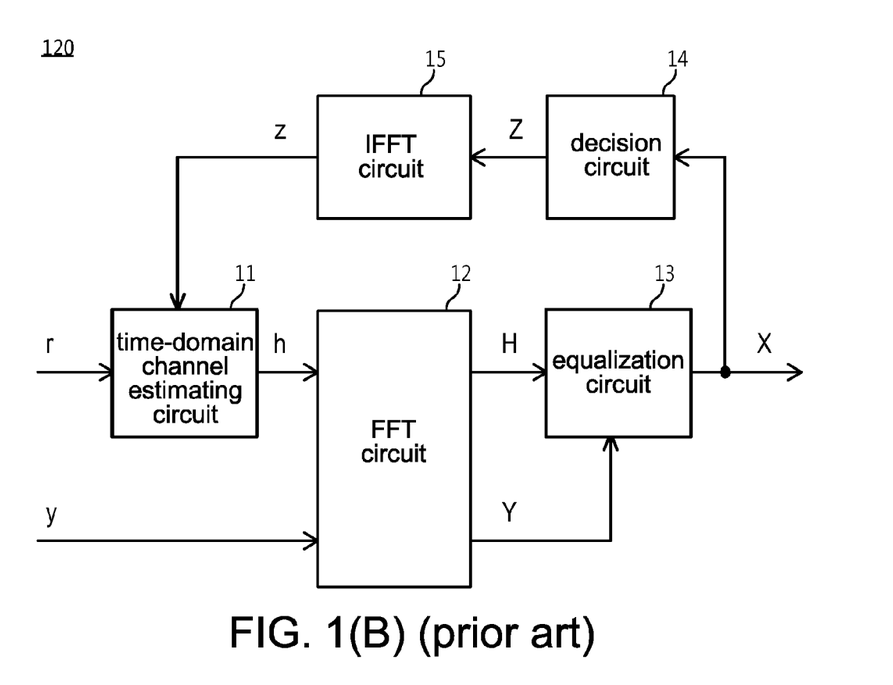
FIG. 1(B) is a circuit diagram of another type of channel effect eliminating device of the prior art.

In view of the above, an improved channel effect eliminating device 120, as shown in FIG. 1(B), has become available. One difference between the channel effect eliminating device 120 and the channel effect eliminating device 100 is that, the channel effect eliminating device 120 further includes a decision circuit 14 and an inverse fast Fourier transform (IFFT) circuit 15. The equalized signal X is transmitted to the decision circuit 14, which applies hard decision on the equalized signal X to generate a decision processed signal Z. The IFFT circuit 15 then converts the hard decision processed signal Z to a feedback signal z, which serves as a part of the reference data for channel estimation of the time-domain channel estimating circuit 11. Compared to the channel effect eliminating device 100, including the feedback signal z in the reference data is equivalently increasing the length of known data. Therefore, the channel estimation result h the time-domain channel estimating circuit 11 generates according to the reference signal r and the feedback signal z better reflects the true channel effect, hence allowing the channel effect eliminating device 120 to more correctly reconstruct the contents of the data signal y.

SUMMARY OF THE INVENTION

According to an embodiment of the present invention, a device for eliminating a channel effect is provided. The device includes a time-domain channel estimating unit, a fast Fourier transform (FFT) unit, an adjusting unit and an inverse fast Fourier transform (IFFT) unit. The time-domain channel estimating unit generates a channel estimation result according to a first reference signal. The FFT unit performs FFT on the channel estimation result to generate a plurality of channel frequency responses corresponding to a plurality of frequency indices. The adjusting unit receives a plurality of input signals corresponding to the plurality of frequency indices, and determines whether to adjust the input signal of each of the frequency indices according to the amplitude of the channel frequency response of each of the frequency indices to generate a set of adjusted signals. The set of adjusted signal include at least one adjusted input signal. The IFFT unit performs IFFT on a set of output signals associated with the set of adjusted signals to generate a feedback signal. The time-domain channel estimating unit further generates another channel estimation result according to a second reference signal and the feedback signal.

According to another embodiment of the present invention, a method for eliminating a channel effect is provided. A first reference signal is provided, and a channel estimation result is generated. FFT is performed on the channel estimation result to generate a plurality of channel frequency responses corresponding to a plurality of frequency indices. A plurality of input signals corresponding to the plurality of frequency indices are received. It is determined whether to adjust the input signal of each of the frequency indices according to the amplitude of the channel frequency response of each of the frequency indices to generate a set of adjusted signal. The set of adjusted signal include at least one adjusted input signal. IFFT is performed on a set of output signals associated with the set of adjusted signal to generate a feedback signal. Another channel estimation result is generated according to a second reference signal and the feedback signal.

The above and other aspects of the invention will become better understood with regard to the following detailed description of the preferred but non-limiting embodiments. The following description is made with reference to the accompanying drawings.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

It is discovered by the Applicant that, in certain channels, e.g., 0 dB echo channels, frequency-domain depth nulls are present. In channels where Doppler's effect exists, the frequency where a depth null exists even consistently changes. Taking signals in FIG. 1(B) for example, for a frequency where the depth null exists, the accuracy of a channel effect response H is usually rather low (i.e., unreliable). A feedback signal z generated according to these unreliable channel frequency responses H inevitably poses undesirable effects on the accuracy of a channel estimation result h. Therefore, a device for eliminating a channel effect of the present invention utilizes an adjusting unit to eliminate or alleviate the effect that these unreliable channel frequency responses cause on the feedback signal.

Figure 2:
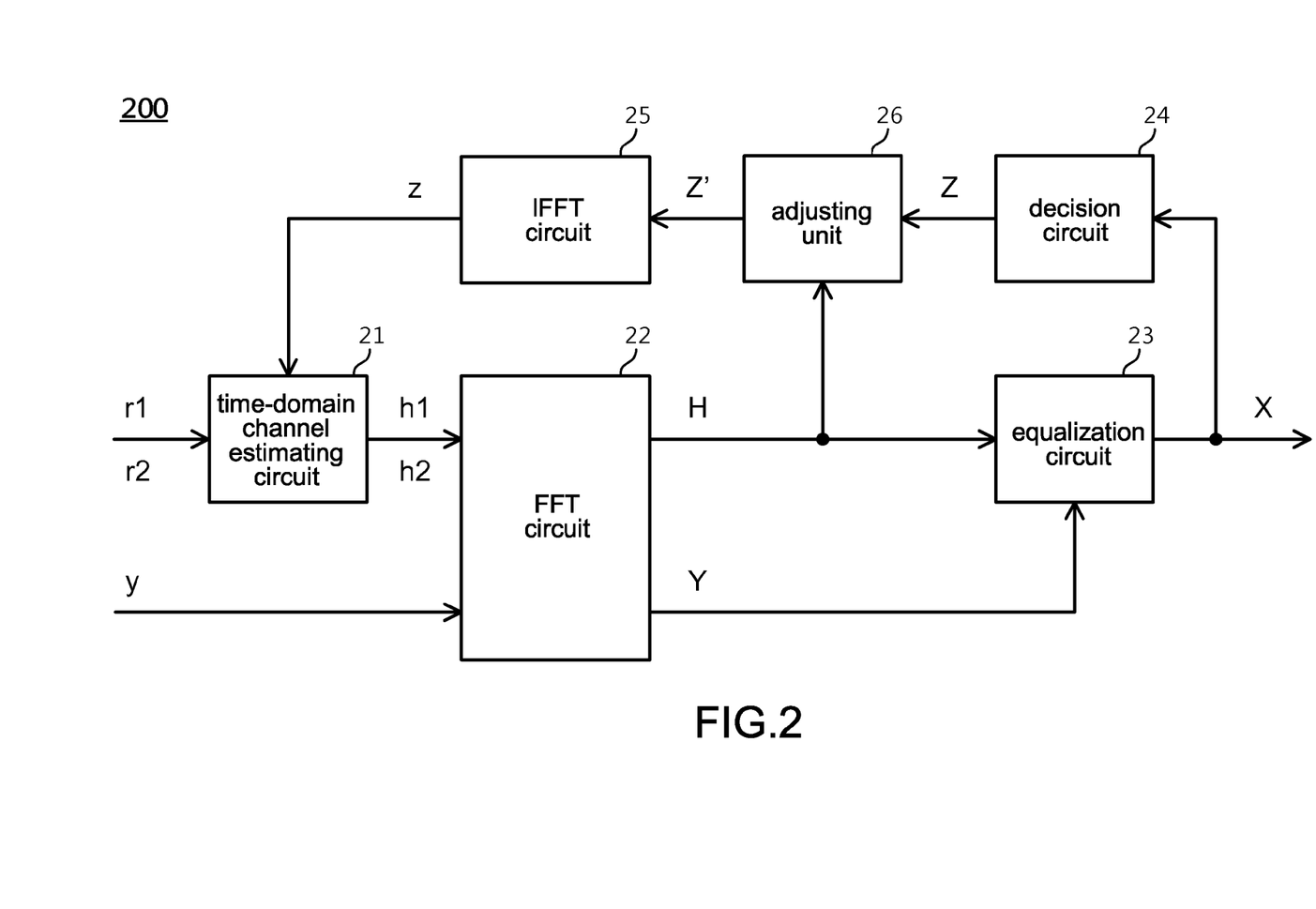
FIG. 2 is a functional block diagram of a channel effect eliminating device according to an embodiment of the present invention.

FIG. 2 shows a functional block diagram of a channel effect eliminating device according to an embodiment of the present invention. A channel effect eliminating device 200 includes a time-domain channel estimating unit 21, a fast Fourier transform (FFT) unit 22, an equalization unit 23, a decision unit 24, an inverse fast Fourier transform (IFFT) unit 25, and an adjusting unit 26. In practice, the channel effect eliminating device 200 may be integrated in various types of wireless signal receiving systems that involve channel estimation.

The time-domain channel estimating unit 21 generates a channel estimation result h1 according to a first reference signal r1. Taking the DTMB standard for example, the reference signal r1 may include headers of multiple consecutive data frames within a certain period. The FFT unit 22 performs FFT on the channel estimation result h1 to generate a plurality of channel frequency responses H(k) corresponding to N frequency indices k. The integer N is an FFT computation point, and the frequency index k may be an integral index between 0~(N−1). The frequency indices k correspond to different frequencies, respectively. Further, the FFT unit 22 also converts a time-domain data signal y to a frequency-domain data signal Y(k) corresponding to the N frequency indices k.

The equalization unit 23 performs an equalization process on the frequency-domain data signal Y(k) and the channel frequency responses H(k) outputted from the FFT unit 22 to generate N equalized signals X(k) corresponding to the N frequency indices. The decision unit 24 performs hard decision on the N equalized signals X(k) to generate N decision processed signals Z(k) corresponding to the N frequency indices. In practice, each of the equalized signals X(k) and the decision processed signals Z(k) may be a complex symbol.

The N channel frequency responses H(k) and the N decision processed signals Z(k) are provided to the adjusting unit 26. For each frequency index k, the adjusting unit 26 determines whether to adjust the decision processed signals Z(k) according to the amplitude of the channel frequency responses H(k), respectively, to generate a set of adjusted decision processed signals Z'. In one embodiment, the adjusting unit 26 determines whether an amplitude index of the amplitude of the channel frequency response of a frequency index k is smaller than a threshold. The amplitude index is positive correlated with an absolute value of the amplitude of the channel frequency response $|H(k)|$, e.g., the absolute value of the amplitude of the channel frequency response $|H(k)|$ or the absolute square of the amplitude of the channel frequency response $|H(k)|^2$. The threshold may be determined by a circuit designer according to the rule of thumb. For example, the threshold may be set to be smaller than an average value of the amplitude indices of normal channel frequency responses H(k) by 20 dB.

When the adjusting unit 26 determines that the amplitude index of the channel frequency response of the frequency index k is smaller than the threshold, the adjusting unit 26 adjusts the decision processed signal Z(k) of the frequency index k, and outputs an adjusted decision processed signal Z'(k) to the IFFT unit 25. When the adjusting unit 26 determines that the amplitude index of the channel frequency response of the frequency index k is greater than or equal to the threshold, the adjusting unit 26 may directly output the original decision processed signal Z(k) as the adjusted decision processed signal Z'(k) to the IFFT unit 25. The adjusting unit 26 may adjust the decision processed signal Z(k) by setting the decision processed signal Z(k) to a predetermined value or by multiplying the decision processed signal Z(k) by a predetermined ratio. For example, the decision processed signal Z(k) may be set to 0, or the decision processed signal Z(k) may be multiplied by 1/10 or 1/100.

For example, assuming that the adjusting unit 26 receives a channel frequency response H(100) and a decision processed signal Z(100) of a frequency index k=100, and determines that the absolute square of the amplitude of the channel frequency response $|H(100)|^2$ for the frequency index k=100 is smaller than the threshold, the adjusting unit 26 then outputs zero to the IFFT unit 25 to serve as an adjusted decision processed signal Z'(100) of the frequency index k=100. Assuming that the adjusting unit 26 receives a channel frequency response H(101) and a decision processed signal Z(101) of a frequency index k=101, and determines that the absolute square of the amplitude of the channel frequency response $|H(101)|^2$ for the frequency index k=101 is greater than the threshold, the adjusting unit 26 then directly outputs the original decision processed signal received to the IFFT unit 25 to serve as an adjusted decision processed signal Z'(101) of the frequency index k=101.

The IFFT unit 25 performs IFFT on the set of adjusted signal Z' outputted from the adjusting unit 26 to generate a feedback signal z. Next, the time-domain channel estimating unit 21 generates another channel estimation result h2 according to a second reference signal r2 and the feedback signal z. It should be noted that, the second reference signal r2 may be the same as or different from the first reference signal r1. For example, the first reference signal r1 may include headers of multiple successive data frames within a period, and the second reference signal r2 may include headers of multiple successive data frames within another subsequent period.

Figure 3:
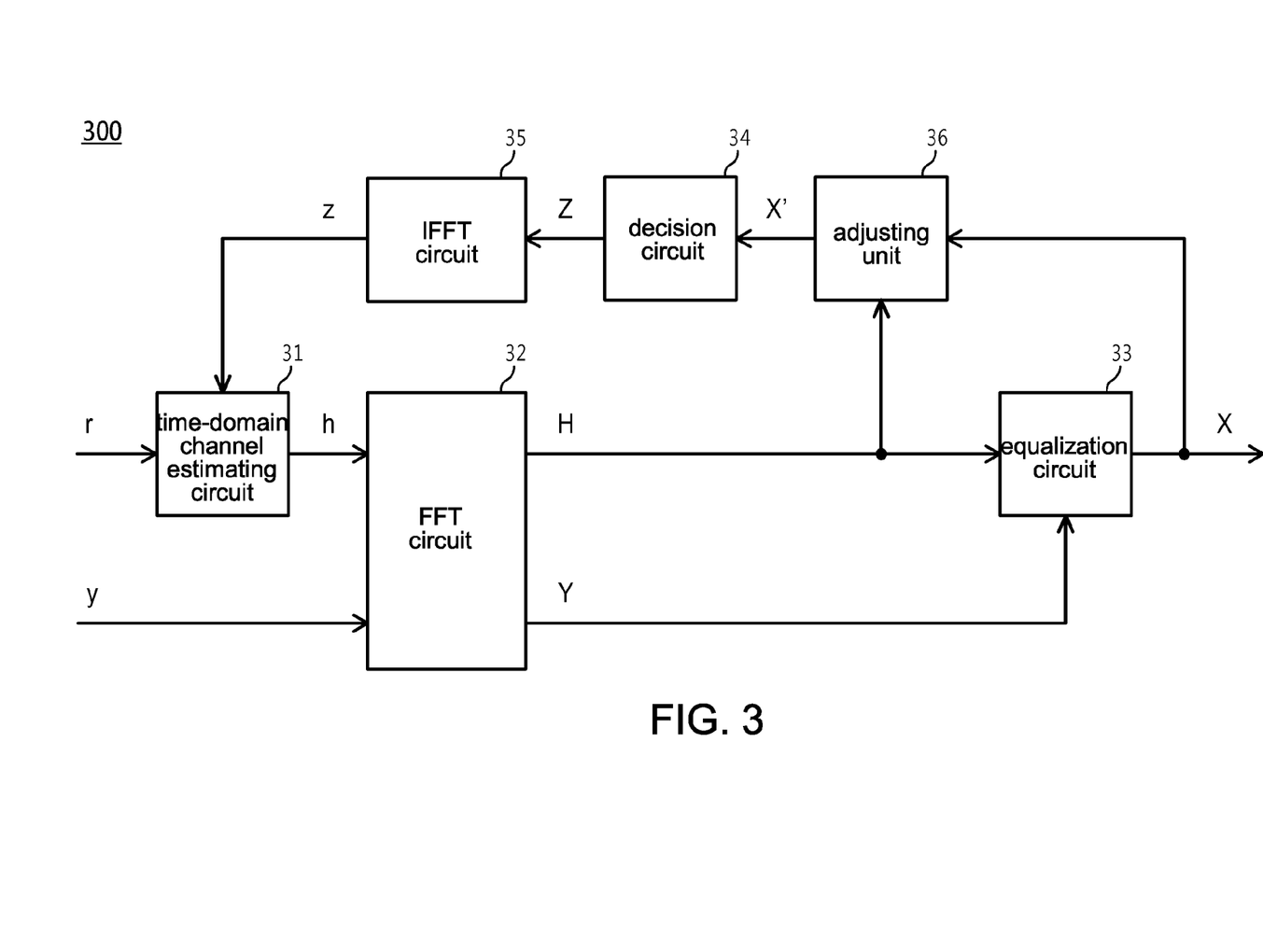
FIG. 3 is a functional block diagram of a channel effect eliminating device according to another embodiment of the present invention.

In conclusion, the adjusting unit 26 identifies unreliable frequency responses by determining whether the amplitude index of the channel frequency response H(k) is smaller than a threshold. When the adjusting unit 26 determines that the amplitude index of a certain channel frequency response H(k) is smaller than the threshold, the channel frequency response H(k) is regarded as an unreliable frequency response. By adjusting the decision processed signal Z(k) corresponding to the unreliable frequency response H(k), the adjusting unit 26 eliminates or alleviates the effect the unreliable channel frequency response H(k) causes on the feedback signal z to enhance the accuracy of the channel estimation result h, so as to allow the channel effect eliminating device 200 to more correctly reconstruct the contents of the data signal y. FIG. 3 shows a functional block diagram of a channel effect eliminating device according to another embodiment of the present invention. One difference between a channel effect eliminating device 200 and the channel effect eliminating device 300 is the position of the adjusting unit. In the channel effect eliminating device 300, an adjusting unit 36 is disposed between an equalization unit 33 and a decision unit 34. Similarly, the adjusting unit 36 determines whether the channel frequency response H(k) is an unreliable frequency response according to whether the amplitude index of the channel frequency response H(k) for a frequency index k is smaller than a threshold. When the adjusting unit 36 determines that the amplitude index of a certain channel frequency response is smaller than the threshold, the channel frequency response is regarded as an unreliable frequency response. In the embodiment, the adjusting unit 36 adjusts the equalized signal X(k) corresponding to an unreliable frequency response to generate a set of adjusted signals X'(k) making the corresponding decision processed signal Z(k) be substantially zero to accordingly eliminate or alleviate the effect these unreliable equalized signals X(k) cause on the feedback signal z, and to enhance the accuracy of the channel estimation result h, so as to allow the channel effect eliminating device 300 to more correctly reconstruct the contents of the data signal y.

Figure 4:
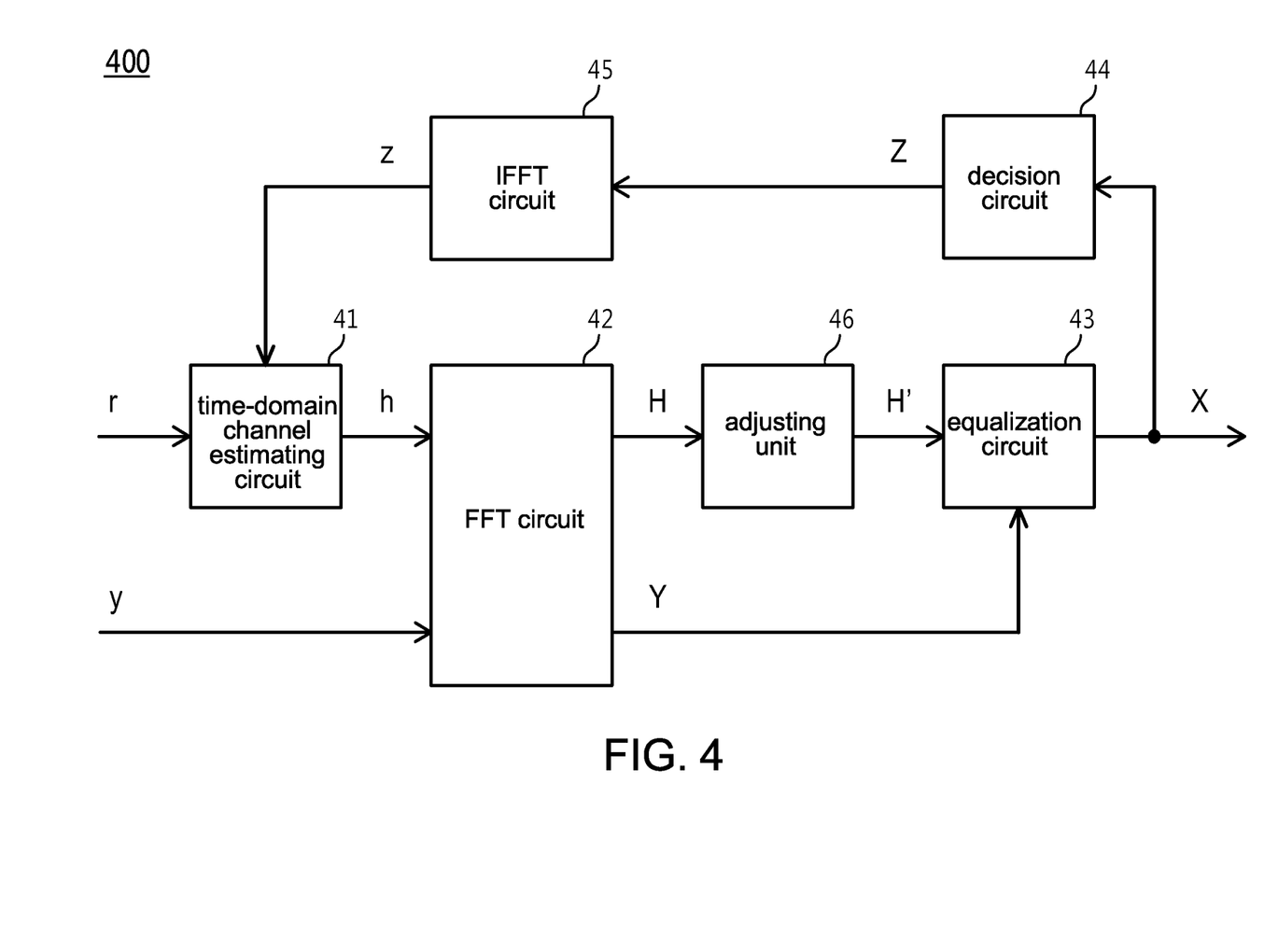
FIG. 4 is a functional block diagram of a channel effect eliminating device according to another embodiment of the present invention.

FIG. 4 shows a functional block diagram of a channel effect eliminating device according to another embodiment of the present invention. One difference between a channel effect eliminating device 400 and the channel effect eliminating device 200 is also the position of the adjusting unit. In the channel effect eliminating device 400, an adjusting unit 400 is disposed between an FFT 42 and an equalization unit 43. Similarly, the adjusting unit 46 determines whether the channel frequency response H(k) is an unreliable frequency response according to whether the amplitude index of the channel frequency response H(k) for a frequency k is smaller than a threshold. When the adjusting unit 46 determines that the amplitude index of a certain channel frequency response is smaller than the threshold, the channel frequency response is regarded as an unreliable frequency response. In the embodiment, the adjusting unit 46 adjusts the unreliable channel frequency response H(k) to generate a set of adjusted signals H'(k) making the corresponding decision processed signal Z(k) be substantially zero to accordingly eliminate or alleviate the effect these unreliable equalized signals X(k) cause on the feedback signal z, and to enhance the accuracy of the channel estimation result h, so as to allow the channel effect eliminating device 400 to more correctly reconstruct the contents of the data signal y.

One person skilled in the art can understand that, although the positions of the adjusting units 26, 36 and 46 are different, the effect of enhancing the accuracy of the channel estimation result is nonetheless achieved, such that the respective channel effect eliminating devices are allowed to more correctly reconstruct the contents of the data signal y. A common feature of the adjusting unit according to the present invention is: receiving a plurality of input signals corresponding to a plurality of frequency indices, and determining whether the input signal of each of the frequency indices is to be adjusted according to the amplitude of the channel frequency response of each of the frequency indices to generate a set of adjusted signals.

In practice, the time-domain channel estimating unit, the FFT unit, the equalization unit, the decision unit, the IFFT unit and the adjusting unit of the present invention may be implemented by hardware, software or firmware. The time-domain channel estimating unit, the FFT unit, the equalization unit, the decision unit, and the IFFT unit may be hardware, software or firmware generally known to one person skilled in the art, and associated details shall be omitted herein. In practice, the adjusting units 26, 36 and 46 may be implemented by various control and processing platforms, including fixed and programmable logic circuits, e.g., programmable logic gate arrays, application-specific integrated circuits, microcontrollers, microprocessors, and digital signal processors. Further, the adjusting units 26, 36 and 46 may be designed to complete respective tasks through a processor command stored in a memory (not shown).

Figure 5:
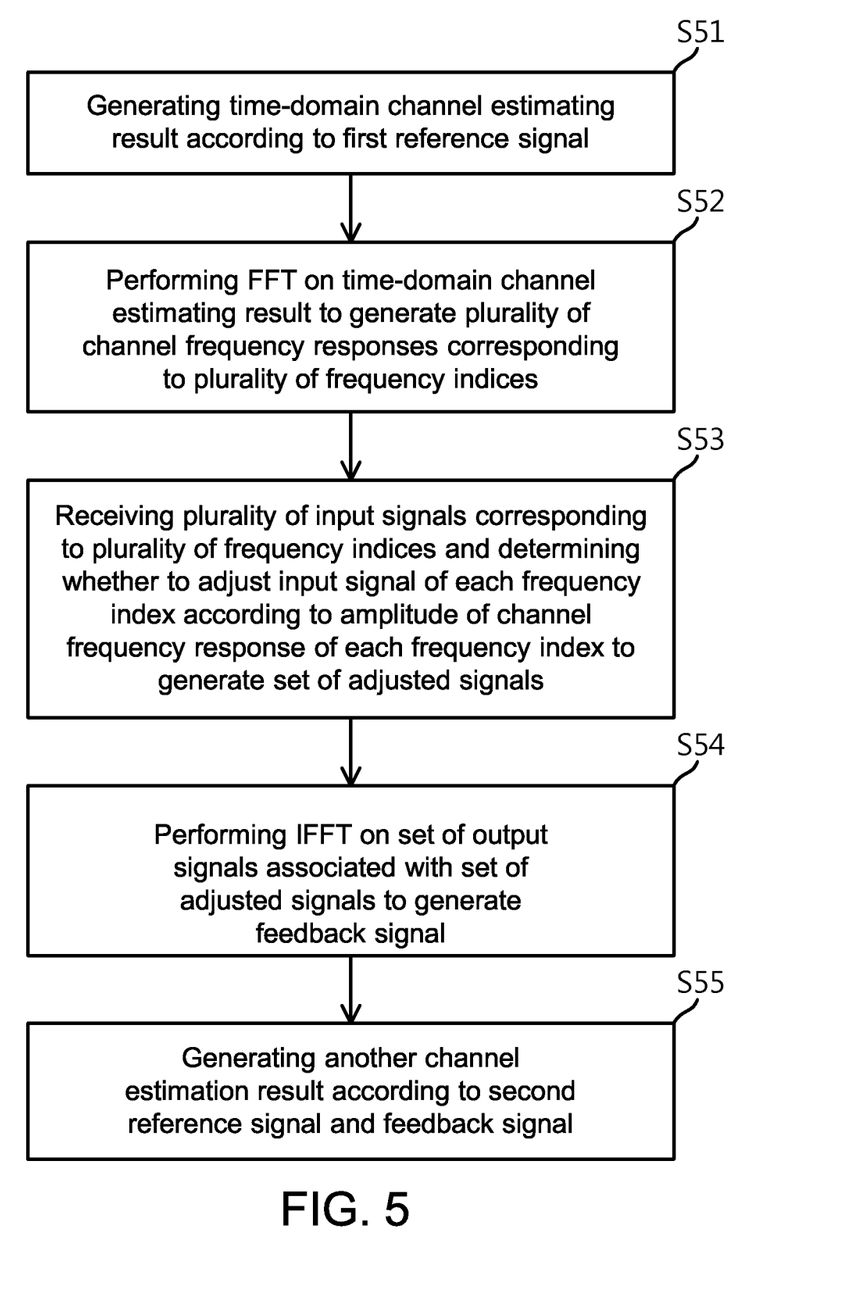
FIG. 5 is a flowchart of a method for eliminating a channel effect according to an embodiment of the present invention.

FIG. 5 shows a flowchart of a method for eliminating a channel effect according to an embodiment of the present invention. In step S51, a channel estimation result is generated according to a first reference signal. In step S52, FFT is performed on the channel estimation result to generate a plurality of channel frequency responses corresponding to a plurality of frequency indices. In step S53, a plurality of input signals corresponding to the plurality of frequency indices are received, and it is determined whether to adjust the input signal of each of the frequency indices according to the amplitude of the channel frequency response of each of the frequency indices to generate a set of adjusted signals. The set of adjusted signals include at least one adjusted input signal. In step S54, IFFT is performed on a set of output signal associated with the set of adjusted signal to generate a feedback signal. In step S55, another channel estimation result is generated according to a second reference signal and the feedback signal.

One person skilled in the art can understand that, the various operation modifications (e.g., the input signal in step S53) in the description associated with the channel effect eliminating devices 200, 300 and 400 are applicable to the channel effect eliminating method, and shall be omitted herein.

It should be noted that, in addition to DTMB receiving systems, the present invention is also suitable for wireless signal receiving systems adopting other similar circuit architecture.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A device for eliminating a channel effect, comprising:
    a time-domain channel estimating unit, generating a channel estimation result according to a first reference signal;
    a fast Fourier transform (FFT) unit, performing FFT on the channel estimation result to generate a plurality of channel frequency responses corresponding to a plurality of frequency indices;
    an equalization unit, generating a plurality of equalized signals corresponding to the plurality of frequency indices according to the plurality of channel frequency responses;
    a decision unit, generating a plurality of decision processed signals corresponding to the plurality of frequency indices according to the plurality of equalized signals;
    an adjusting unit, receiving a plurality of decision processed signals corresponding to the plurality of frequency indices, and determining whether to reduce an amplitude of the plurality of decision processed signals of each of the frequency indices according to an amplitude of the channel frequency response of each of the frequency indices to generate a plurality of adjusted decision processed signals; and
    an inverse fast Fourier transform (IFFT) unit, performing IFFT on the plurality of decision processed signals to generate a feedback signal;
    wherein, the time-domain channel estimating unit further generates another channel estimation result according to a second reference signal and the feedback signal.

2. The device according to claim 1, wherein the adjusting unit determining whether to reduce the amplitude of the plurality of decision processed signals of each of the frequency indices according to the amplitude of the channel frequency response of each of the frequency indices to generate the set of adjusted signals comprises:
    the adjusting unit determining whether an amplitude index of a channel frequency response of a frequency index is smaller than a threshold, wherein the amplitude index is positively correlated with an absolute value of the amplitude of the channel frequency response; and
    the adjusting unit reducing the amplitude of the plurality of decision processed signals corresponding to the frequency index according to a determination result indicating that the amplitude index of the channel frequency response of the frequency index is smaller than the threshold.

3. The device according to claim 2, wherein the adjusting unit reducing the amplitude of the plurality of decision processed signals to the frequency index according to the determination result indicating that the amplitude index of the channel frequency response of the frequency index is smaller than the threshold comprises:
    the adjusting unit reducing the amplitude of the plurality of decision processed signals corresponding to the frequency index to a predetermined value according to the determination result indicating that the amplitude index of the channel frequency response of the frequency index is smaller than the threshold.

4. The device according to claim 3, wherein the predetermined value is zero.

5. The device according to claim 2, wherein the adjusting unit reducing the amplitude of the plurality of decision processed signals corresponding to the frequency index according to the determination result indicating that the amplitude index of the channel frequency response of the frequency index is smaller than the threshold comprises:
    the adjusting unit multiplying the amplitude of the plurality of decision processed signals corresponding to the frequency index by a predetermined ratio according to the determination result indicating that the amplitude index of the channel frequency response of the frequency index is smaller than the threshold.

6. A method for eliminating a channel effect, comprising:
    a) generating a channel estimation result according to a first reference signal;
    b) performing fast Fourier transform (FFT) on the channel estimation signal to generate a plurality of channel frequency responses corresponding to a plurality of frequency indices;
    c) generating a plurality of equalized signals corresponding to the plurality of frequency indices according to the plurality of channel frequency responses;
    d) generating a plurality of decision processed signals corresponding to the plurality of frequency indices according to the plurality of equalized signals;
    e) receiving a plurality of decision processed signals corresponding to the plurality of frequency indices, and determining whether to reduce an amplitude of the plurality of decision processed signals of each of the frequency indices according to an amplitude of the channel frequency response of each of the frequency indices to generate a adjusted plurality of adjusted decision processed signals;
    f) performing inverse fast Fourier transform (IFFT) on the plurality of decision processed signals to generate a feedback signal; and
    g) generating another channel estimation signal according to a second reference signal and the feedback signal.

7. The method according to claim 6, wherein step (e) comprises:
    e1) determining whether an amplitude index of a channel frequency response of a frequency index is smaller than a threshold, wherein the amplitude index is positively correlated with an absolute value of the amplitude of the channel frequency response; and
    e2) reducing the amplitude of the plurality of decision processed signals corresponding to the frequency index according to a determination result indicating that the amplitude index of the channel frequency response of the frequency index is smaller than the threshold.

8. The method according to claim 7, wherein step (e2) comprises:
    reducing the amplitude of the plurality of decision processed signals corresponding to the frequency index to a predetermined value according to the determination result indicating that the amplitude index of the channel frequency response of the frequency index is smaller than the threshold.

9. The method according to claim 8, wherein the predetermined value is zero.

10. The method according to claim 7, wherein step (e2) comprises:
    multiplying the amplitude of the plurality of decision processed signals corresponding to the frequency index by a predetermined ratio according to the determination result indicating that the amplitude index of the channel frequency response of the frequency index is smaller than the threshold.

* * * * *